US009727753B2

(12) United States Patent
Taylor et al.

(10) Patent No.: US 9,727,753 B2
(45) Date of Patent: Aug. 8, 2017

(54) WATERMARK ACCESS/CONTROL SYSTEM AND METHOD

(71) Applicant: NBCUniversal Media, LLC, New York, NY (US)

(72) Inventors: Jeffrey Edward Taylor, Chatsworth, CA (US); Patrick Pearce Cusack, Los Angeles, CA (US)

(73) Assignee: NBCUniversal Media, LLC, Wilmington, DE (US)

( * ) Notice: Subject to any disclaimer, the term of this patent is extended or adjusted under 35 U.S.C. 154(b) by 508 days.

(21) Appl. No.: 14/010,234

(22) Filed: Aug. 26, 2013

(65) Prior Publication Data
US 2015/0058623 A1 Feb. 26, 2015

(51) Int. Cl.
G06F 21/64 (2013.01)
G06F 21/16 (2013.01)

(52) U.S. Cl.
CPC ............. *G06F 21/64* (2013.01); *G06F 21/16* (2013.01)

(58) Field of Classification Search
CPC .................................. G06F 21/16; G06F 21/64
See application file for complete search history.

(56) References Cited

U.S. PATENT DOCUMENTS

| | | | | |
|---|---|---|---|---|
| 6,069,914 A * | 5/2000 | Cox | ......................... | H04N 5/913 375/130 |
| 7,111,169 B2 * | 9/2006 | Ripley | ............. | G11B 20/00086 348/E7.056 |
| 7,216,368 B2 * | 5/2007 | Ishiguro | .................. | G06F 21/10 705/57 |
| 7,305,104 B2 * | 12/2007 | Carr | ....................... | G06T 1/0064 382/100 |
| 7,562,397 B1 * | 7/2009 | Mithal | ............... | G06Q 30/0235 705/52 |
| 7,788,235 B1 * | 8/2010 | Yeo | ......................... | G06F 21/606 707/687 |
| 2005/0105884 A1 * | 5/2005 | Satoh et al. | ..................... | 386/69 |
| 2008/0028474 A1 * | 1/2008 | Horne et al. | ..................... | 726/27 |

* cited by examiner

*Primary Examiner* — Saleh Najjar
*Assistant Examiner* — Simon Kanaan
(74) *Attorney, Agent, or Firm* — Fletcher Yoder, P.C.

(57) ABSTRACT

A digital file is associated with a security attribute related to watermarking criteria. The digital file content is encrypted, and may not be decrypted by a receiving computer unless the watermarking criteria is met. The receiving computer may decrypt only the encrypted portion of the security attribute unless the watermarking criteria are continuously met at the receiving computer. Improved security and reduction of pirating of the digital content is therefore provided.

34 Claims, 7 Drawing Sheets

```
100─┐
┌────────────────────────────────────────────────┐
│ ☐ WATERMARK           CLIENT            ? │ X │
├────────────────────────────────────────────────┤
│ VISIBLE WATERMARK...                           │
│ WHAT TO DO – SET THE TEXT AND PARAMETERS FOR A VISIBLE │
│ WATERMARK TO BE DISPLAYED VIA SEAL ON THE ACCESSING WORKSTATION │
│ DESCRIPTION│SOURCE│DESTINATION│VIEWERS│WATERMARK│VIEWER OPTIONS│CONTACT DETAILS│SUMMARY │
│         LOCATION              FONT             │
│   ┌─────────────┐     104─┐ ┌──────────┬─┐    │
│   │X           X│              │          │↓│    │
│   │             │╲102   SIZE                   │
│   │   EXAMPLE   │      106─┐ ┌──────────┬─┐    │
│   │             │              │          │↓│    │
│   │X           X│         COLOR                 │
│   └─────────────┘     108─┐ ┌──────────┬─┐    │
│     ┌─────────┬─┐            │          │↓│    │
│     │ MIDDLE  │↓│       OPACITY                │
│ 112 └─────────┴─┘     110─┐ ┌──────────┬─┐    │
│   ┌TEXT                       │          │↓│    │
│   │EXAMPLE                                      │
│                                                │
│   ☑ REQUIRED FOR DECRYPTION ─114              │
│ ┌────────┐                    ┌──────┬──────┐ │
│ │ CANCEL │                    │ BACK │ NEXT │ │
│ └────────┘                    └──────┴──────┘ │
└────────────────────────────────────────────────┘
                    FIG. 5
```

```
130─┐
┌────────────────────────────────────────────────┐
│ ☐ VIEWER OPTIONS                        ? │ X │
├────────────────────────────────────────────────┤
│ EDITING VIEWER OPTIONS                         │
│ YOU CAN EDIT THE START DATE, END DATE, AND JOB PASSWORD FOR A PARTICULAR │
│ VIEWER. THE "COPY ALLOWED" CHECKBOX ALLOWS USERS TO CREATE A CLEAN COPY │
│ OF THE ENCRYPTED FILE BEGINNING ON THE SPECIFIED DATE. THE "TRANSCODING │
│ ALLOWED" CHECKBOX ALLOWS USERS TO CONVERT THE FILE FROM ONE FORMAT TO │
│ ANOTHER STARTING ON THE SPECIFIED DATE         │
│ 132─┐VIEWER'S NAME:    │JACK O. LANTERN      │ │
│     ┌VIEW ACCESS START:│1/15/2013        │▼│  │
│ 134┤                                            │
│     └VIEW ACCESS END:  │2/15/2013        │▼│ ☑NONE │
│ 136─┐TRANSCODING ALLOWED: ☐   ON DATE │1/15/2013│▼│ │
│ 138─┐COPY ALLOWED:        ☐   ON DATE │1/15/2013│▼│ │
│     ┌VIEWER PASSWORD:  │***********     │ │STRONG│ │
│ 140┤                                            │
│     └CONFIRM PASSWORD: │***********     │ │MATCH │ │
│ 142─┐WATERMARK TEXT:   │UNIQUE EXAMPLE  │ │SETTINGS│ │
│ ┌─────────────┐              ┌────────┬──────┐ │
│ │JOB DEFAULTS │              │ CANCEL │ SAVE │ │
│ └─────────────┘              └────────┴──────┘ │
└────────────────────────────────────────────────┘
                                          144
                    FIG. 6
```

FIG. 10

WATERMARK ACCESS/CONTROL SYSTEM AND METHOD

BACKGROUND

The present invention relates generally to reactive content security. More particularly, the invention relates to a novel technique for incorporating and/or controlling forensic watermarking at a content receiving system.

Many environments require that electronic files be transmitted in a secure manner. For example, text documents, images, audio, video and multi-media files are commonly transmitted between computers, or between servers via the Internet. The transmission may be intercepted or otherwise diverted or replicated, possibly leading to a compromise of security. A number of techniques have been developed to address such concerns. For example, forensic watermarks may be incorporated into content, which may help in analyzing how the content has been compromised. For example, the forensic watermark may provide details indicating a particular copy of the content (e.g., a copy provided from a particular source or a copy provided for an intended recipient). Accordingly, upon analysis of the watermark, it may become clear, based upon the data provided by the watermark, which copy of the content has been compromised While such techniques are effective in certain circumstances, the actual security is again subject to the relative strength or weakness of the watermarking processes. For example, while source-based watermarking may provide an indication of a particularly sourced version of the content, it may not provide other indications, such as a particular recipient user and/or device.

Certain areas of technology are particularly demanding in this regard. For example, in multi-media production, large files are often exchanged between various parties, such as for post-production mixing, refinement, processing, and so forth. This is typically performed through the use of proxy video files, which may be somewhat substandard copies, produced in lower resolution or compressed, which may incorporate watermarks or other devices to limit their attractiveness to those who might consider pilfering such files. However, if such files are pilfered or otherwise pirated, they may be disseminated widely and easily, such as by posting on the Internet. Such activities pose hazards to security, and may greatly reduce the commercial value of the production represented by the digital file.

There is, at present, a great need for improved techniques for secure transmission and use of digital files. In particular, there is a need for a technique that will allow a provider of a digital file to quickly and easily create a file format or message that can be transmitted to or accessed by one or more designated recipients and that can ensure that information relating to the recipient is available as a forensic solution as those recipients access and/or manipulate the underlying digital content. Further, there is a need to reduce overly burdensome pre-processing of traditional watermarking approaches.

BRIEF DESCRIPTION OF THE INVENTION

The present invention provides a novel technique designed to respond to such needs. The technique may be used with any type of digital file, and is particularly well-suited to sensitive files that must be exchanged between a provider and one or more designated recipients. The files may include, for example, text files, image files, multi-media files, proxy video files, pre-production and post-production working files, and so forth.

In accordance with certain embodiments, a method is provided for controlling access to a file. In accordance with the method, on a reading computer, an encrypted file is accessed. The file includes encrypted digital content. Upon accessing the encrypted file, the reading computer actively provides watermarking on the reading computer's display. The reading computer continuously verifies that watermarking is currently being provided. Upon verifying that watermarking is currently being provided, the reading computer decrypts the file. The encrypted digital content is decrypted only if the reading computer determines that watermarking is currently being provided. Upon detecting that watermarking is no longer being provided, the reading computer re-encrypts the file.

Further, in accordance with certain embodiments, a method (e.g., implemented as computer-instructions on a tangible, non-transitory, machine readable medium) is provided. The method for controlling access to a digital file includes associating digital content with a security attribute. The security attribute includes watermarking criteria, a pointer to watermarking criteria, or both. The method encrypts the security attribute and the digital content to create an encrypted digital file. The security attribute being susceptible to decryption separate from the content and the digital content is susceptible to valid decryption only upon the watermarking criteria being met.

In certain embodiments, an additional method for controlling access to a digital file includes associating digital content with a security attribute, the security attribute including watermarking criteria, a pointer to watermarking criteria, or both. The method includes encrypting the security attribute and the digital content to create an encrypted digital file, receiving an indication of one or more attributes for a watermark to be presented with decrypted digital content, and associating the attributes of the watermark with the encrypted digital content to create the encrypted digital file, such that the one or more attributes for the watermark may be used by a receiving computer that provides the watermark.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
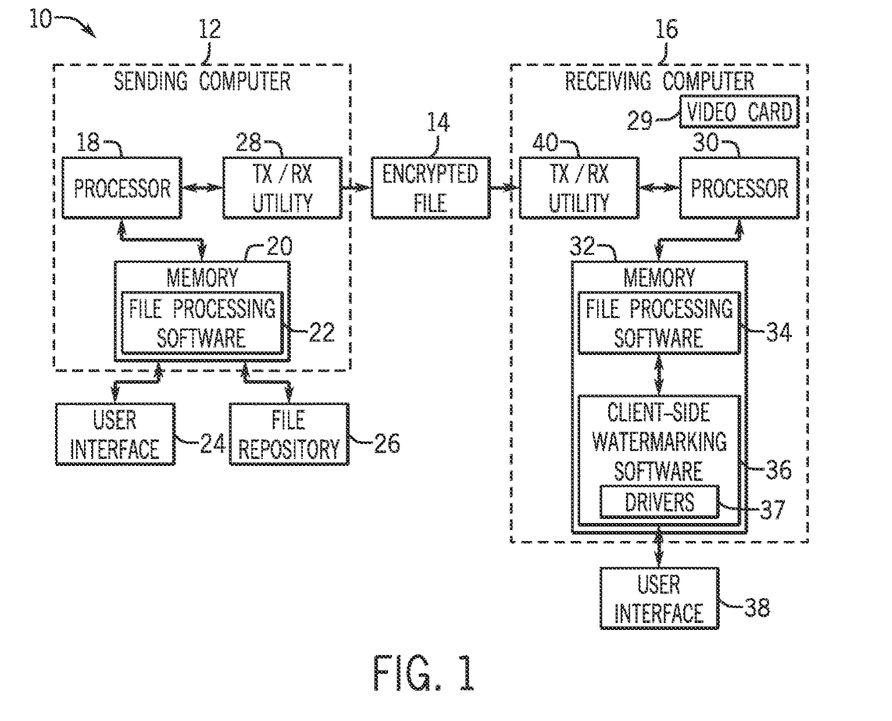
FIG. 1 is a diagrammatical overview of a system for transmitting a digital file in a secure manner between a sending computer and a receiving computer, in accordance with an embodiment.

Turning now to the drawings, and referring first to FIG. 1, a system 10 is illustrated for transferring and using digital file or digital data in a secure manner. In the illustrated embodiment, the system includes a sending computer 12 that is adapted to send an encrypted file 14 to a receiving computer 16. As will be appreciated by those skilled in the art, the file will typically be sent over the Internet, and transmission networks may include servers, local area networks, wide area networks, virtual private networks, and so forth, not specifically illustrated in FIG. 1. Indeed, throughout the present discussion, reference will be made to the sending computer and the receiving computer, although, in practical applications, there may be multiple sending computers, and multiple receiving computers, as well as various components associated with these for the delivery of data transmissions, such as servers, routers, gateways, and software associated with these devices that facilitate data transmission.

In the illustrated embodiment, sending computer 12 includes a processor 18 and memory 20 adapted to work together to process digital content and to send it to the receiving computer as described below. The processor 18 may include any suitable hardware, firmware and software, and may be embodied in an application-specific computer or in a general-purpose computer. In addition to other support circuits, such as power supplies, disc drives, and so forth, the computer memory 20 may be of any sort, including, for example, random access memory, programmable read-only memory, electronically programmable read-only memory, disc drives, optical storage devices, dynamic memory, and so forth. In addition to other software stored in the memory that can be executed by the processor 18, memory 20 stores file processing software 22 which is used to encrypt, compress and otherwise manipulate digital content that is to be sent in the encrypted file 14, as described more fully below. In general, the software 22 is executed by the processor 18 during operation and serves to create or condition the file for transmission in accordance with the invention.

The sending computer 12 is designed to interoperate with a user interface 24. The user interface may include various components generally known in the art, such as a keyboard, a mouse, a monitor, a printer, and so forth. As described below, the user interface may include a graphical user interface that allows for a human user to designate one or more intended recipients for the digital content contained in the encrypted file 14. The user interface also allows the user to select digital content for transmission to the intended recipients, and to coordinate its formulation into the encrypted file 14 and the transmission of the encrypted file to the recipients. The sending computer 12 is also adapted to interact with a file repository 26. In certain simple implementations, the file repository 26 may be part of memory 20. However, the repository may be separate or even remote from the sending computer 12. The file repository stores digital content in the form of text files, video files, audio files, multi-media files, and so forth that may be selected by a user via the user interface 24 for creation of the encrypted file 14 that is to be transmitted to the one or more intended recipients.

The receiving computer 16 may include a personal compute (PC), server, or handheld electronic device, such as a cellular phone, tablet computer, or notebook computer. The receiving computer 16 is equipped similarly to the sending computer. That is, the receiving 16 includes a video card 29, processor 30 and memory 32 that includes file processing software 34 designed to facilitate processing of the encrypted file once received by the receiving computer and client-side watermarking software 36 that may be used to incorporate client-side watermarking into displayed digital content.

The client-side watermarking software 36 may include special drivers 37 associated with the video card 29. The drivers 27 may enable visible and/or invisible watermarks to be inserted into the video output of the video card 29. Accordingly, these watermarks may be displayed as an overlay of the receiving computer 16 (e.g., by placing a transparent frameless window on the top level of each screen on the receiving computer 16). Watermarking video drivers 27 may be generated for all major video cards on the market. For example, drivers 27 associated with Blackmagic Design cards, Aja Video cards, and/or NVIDIA based cards may be generated. Additionally, video card 29 manufacturers may directly support the watermark functionality in their manufacturer drivers. In order to ensure that no video output is enabled without the watermarking functionality, the watermarking software 36 may detect when non-watermarking drivers are installed. The watermarking software 36 may disable any ability to decrypt an encrypted file 14 when non-watermarking drivers are detected.

In general, the file processing software 34 is executed by the processor 30 as described below, and enables the system to determine whether the encrypted file can be opened and decrypted, as well as providing for decompression of any contents of the file, viewing or interacting with the contents of the file, and so forth. For example, when the receiving computer 16 is a cellular telephone running an operating system, such as Windows Phone, Android, or iOS®, the file processing software 34 and the client-based watermarking software 36 may include an application or operating system process compatible with the cellular telephone's operating system. The receiving computer 16 may also associated with a user interface 38, which will typically include a keyboard, a computer mouse, a monitor, and any other components that facilitate accessing and interacting with the digital contents of the encrypted file. As with the sending computer 12, the receiving computer 16 may be an application-specific computer or a general purpose computer.

In some embodiments, the receiving computer 16 may be configured to allow access to digital content only when watermarking features are actively provided. For example, the file processing software 34 may be configured to allow access (e.g., decrypt) the encrypted file 14 when the client-side watermarking software 36 is actively presenting a watermark. Thus, to the extent that file processing software 34 is present on any suitable receiving computer 16, the status of the client-side watermarking software 36 may be determined as active and the encrypted file 14 accessed and manipulated to view or otherwise interact with the digital contents as described below.

In the embodiment illustrated in FIG. 1, the sending computer 12 and the receiving computer 16 are configured with transmission and reception utilities 28 and 40, respectively. These utilities may include electronic messaging programs, automatic and manual messaging and file sharing programs, and so forth. While described as "utilities," in certain embodiments, the transmission and reception utilities 28 and 40 may be any available data transmission and reception protocols (e.g., TCP-IP over Ethernet, etc.). The "utilities" enable the encrypted file to be transmitted from the sending computer 12 to the receiving computer 16, as well as allowing for messages to be transmitted between the two computers as described below. It should also be noted, however, that while a scenario is envisioned in which the sending computer 12 prepares and sends the encrypted file 14 in a message to the receiving computer 16, other scenarios may also be envisaged. For example, the sending computer 12 may, where desired, place the encrypted file 14 in a shared repository to which the receiving computer 16 can gain access. Thus, when the encrypted file 14 is ready for access or manipulation by the receiving computer 16, the sending computer 12 may notify a person, or the receiving computer 16 of such availability, and the receiving computer 16 may retrieve the file as desired. In all such scenarios, however, some sort of utility will typically be provided for uploading the encrypted file 14 into such a shared repository and for downloading the file into the receiving computer 16 for secure access.

Figure 2:
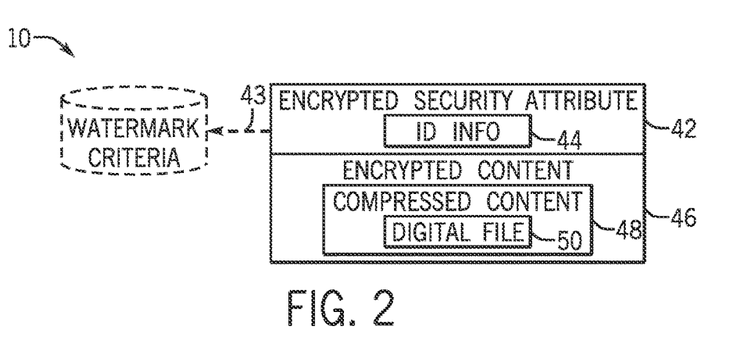
FIG. 2 is a diagrammatical representation of a typical file constructed in accordance with an embodiment.

FIG. 2 illustrates a presently contemplated configuration for the encrypted file transmitted to the receiving computer. In the embodiment illustrated in FIG. 2, the encrypted file 14 includes a security attribute 42 (e.g., a file attribute or header) which, in the illustrated embodiment, is itself encrypted. In some embodiments, only portions of the security attribute 42 may be encrypted. For example, the security attribute 42 may include file metadata such as a filename, owner, etc. that does not need to be encrypted. Thus, in some embodiments, only portions of the security attribute 42 will be encrypted. The encrypted security attribute may include identification data 44 which may indicate an intended recipient, source, or other information about the encrypted file 14. This identification data may be, for example, a character string or other type of data. Further, as will be discussed in more detail below, the security attribute may include certain watermarking criteria, such as an indication of whether or not watermarking is required to obtain access to the encrypted file 14 and/or particular watermarking settings (e.g., font type, color, size, opacity, etc.). In some embodiments, the security attribute 42 may include a pointer 43 that identifies an external location (e.g., a database location 45) where watermarking criteria may be stored. As noted above, in certain cases, the security attribute may not be encrypted. The encrypted file 14 also includes an encrypted content portion 46 which consists of encrypted content. Essentially, the encrypted content 46 will include the digital file 50 to which access is to be restricted. In the presently contemplated embodiment illustrated in FIG. 2, the encrypted content includes compressed content 48 which, itself, embodies the final digital file 50. Though the content 48 is shown as compressed in the current embodiments, content compression is an optional step that may not be provided in certain embodiments. As noted above, the digital file 50, itself, may be code that can be interpreted by an application program to provide a representation of a text document, a video document, an audio document, a multimedia presentation or show, and so forth. As will be appreciated by those skilled in the art, during compilation of the encrypted file 14, the digital file 50 is first selected, and is optionally compressed to create the compressed content 48. The compression may be performed by any suitable compression utility, such as JPEG, MPEG, or various specialized encoding processes, such as Huffman encoding, run length encoding, various available lossless or lossy encoding algorithms, and so forth. Similarly, encryption of the compressed content may be performed by any suitable available encryption utility. In certain circumstances, the digital file 50 may be encrypted without being first compressed.

In some embodiments, the digital data file 50 is sent in a "read only" or "play only" format, and cannot be altered by the receiving computer 16. This is particularly attractive in certain types of applications, such as for post-production stages of television, video and film projects. In such applications, the receiving computer 16 may create new files that are later synchronized or otherwise associated with the received file 14, with no real need to alter the original digital content. Similarly, the digital file 50 may be streamed to the receiving computer, such that a full copy of the digital data file 50 does not reside on the receiving computer 16. In other applications, however, it may be useful to permit such alteration or modification.

Figure 3:
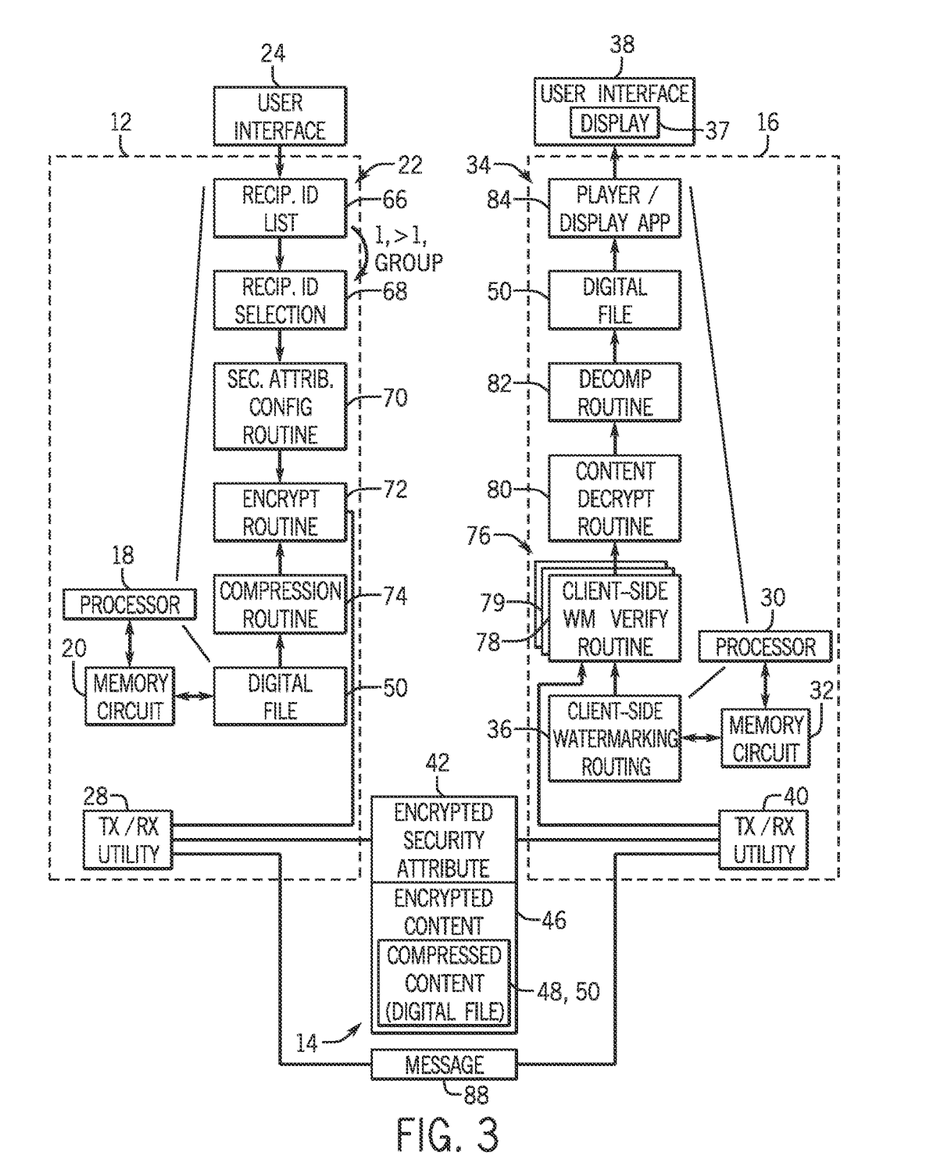
FIG. 3 is a diagrammatical representation of certain of the functional components of the sending and receiving computers of FIG. 1, adapted for transmission of a secure file of the type illustrated in FIG. 2, in accordance with an embodiment.

FIG. 3 illustrates exemplary functional components contained within the sending computer 12 and the receiving computer 16 for transmission and use of the digital file in the form of the encrypted file 14. As noted above, the sending computer will have a user interface 24 that allows a human user to select the digital file to be packaged and sent to the receiving computer 16. The receiving computer 16, in turn, includes a user interface 38 that allows human user to interact with the file once received, so long as client-side watermarking is active, as described below.

In the embodiment illustrated in FIG. 3, the sending computer 12 includes or has access to a recipient identification list 66 which allows the user to select one or more intended recipients for the encrypted file. In a presently contemplated embodiment, the recipient identification list 60 may be available in a drop-down menu or other interface facility and may list recipients by code, name, organization, and so forth. The user may then select one or more intended recipients from the list to create a recipient identification selection 68. The recipient identification selection 68, again, may include one or more individual recipients, or a group of recipients, such as a post-production company, department, group, and so forth. Further, the recipient identification selection 68 may include a general user selection. As will be discussed in more detail below, the general user selection may enable manual entry of allowed recipient identities to access the encrypted content. In some embodiments, the recipient identification selection 68 is then used to configure the security attribute 42. In particular, the security attribute 42 will be formatted by a security attribute configuration routine 70 to include an indication of the one or more recipients selected by the user. In the case of a security attribute 42 that is to be encrypted, the security attribute configuration routine 70 will then advance the configured security attribute 42 to an encryption routine 72 which will encrypt the security attribute.

It should be noted that the selection of one or more recipients may, in practice, involve reference to a database structure that will include a listing of potential recipients, any groups or organizations with which they are associated, and the identification data associated with them. For example, the general user selection may be associated to one or more identities in the database structure. However, such data will preferably be secure from view to the user. That is, the identification data for intended recipients will, in most cases, be kept secret such that the data may not be pilfered or reproduced, thereby ensuring that unwanted access to the digital content is thwarted.

It should also be noted that, in addition to the technique of use of the secure identification data outlined in the present discussion, the sending computer may also encode the encrypted file to time out (i.e., disallow access after a specific time or date), or to limit the number of times the file may be accessed.

At the same time, the user, via the user interface 24, can select the digital file 50 (or package of digital files 50) from memory circuit 20 or from a file repository as indicated with reference to FIG. 1 in the case of file repository 26. With a digital file selected, the sending computer 12 can optionally execute a compression routine 74 designed to compress the digital contents of the file 50, where desired. The digital file 50, then, either compressed or uncompressed, will be routed to the encryption routine 72 which will encrypt the digital file and associate the digital file with the header. It should be noted that the various routines summarized in FIG. 4 within the sending computer will typically be stored within the memory circuitry and will be executed by processor 18.

Once the digital file has been associated with a security attribute 42 that includes the identification data 44, the transmit and receive utility 28 can forward the file to the receiving computer 16 (or make the file available via a shared repository as noted above). As described above, the file will include the security attribute 42 with the identification data 44, as well as the encrypted content 46 which may be compressed. In some embodiments, the general user selection may be associated with specific identities in the database structure, as discussed above. In such embodiments, the security attribute 42 may not include identification data 44 for the general user selection, but instead a pointer to the database structure described above. The database structure may store the identification data 44 corresponding to the general user selection, and thus the identification data 44 may be obtained by querying the database structure based upon the database pointer.

The receiving computer 16 includes software routines that enable it to activate client-side watermarking and determine whether the receiving computer has authorization to access the encrypted digital file contents based upon the status of the client-side watermarking. In particular, as illustrated in FIG. 3, the encrypted file 14 is received in the receiving computer 16 by the transmit and receive utility 40. Concurrently, the client-side watermarking routine 36 is actively running on the receiving computer 16. In certain embodiments, the encrypted file 14 is advanced to a security attribute decryption routine (not shown), when the security attribute is encrypted in the encrypted file 14.

The decryption of the encrypted content including the digital file data itself is performed until other criteria is met. Accordingly, the encrypted file 14 is forwarded to one or more criteria verification routines 76, which verify that certain criteria is met prior to decrypting the file 14. For example, in some embodiments, an identification verification routine may determine whether a current user of the receiving computer 16 is specified in the security attribute 42. In some embodiments, the encrypted content 46 may only be decrypted upon data in the security attribute 42 matching data in a physical key removeably-coupled to the receiving computer 16.

In certain embodiments, a client-side watermarking verification routine 78 may be provided. This verification routine 78 may determine any client-side watermarking criteria that must be met prior to decrypting the encrypted content 46. For example, any such criteria may be stored as one or more attributes within the security attribute section 42 of the encrypted file 14. The verification routine 78 may access the security attribute section 42 and analyze any information provided in section 41 for any client-side watermarking criteria. Further, this routine 78 may verify whether or not any such client-side watermarking criteria are met.

Additionally, in certain embodiments, a blacklisted application criteria verification routine 79. This routine 79 may determine if any blacklisted applications have been provided (e.g., in the security attribute 42). The routine 79 may verify whether or not any blacklisted applications are running at the receiving computer 16, and only proceed towards decryption if no blacklisted applications are detected. As will be discussed in more detail below, this routine 79 may help counteract any applications which may hinder watermarking functionality.

If all client-side watermarking criteria is met, along with the blacklisted application criteria 79 and the other criteria 76, the receiving computer 16 is authorized to proceed to decryption of the digital file contents within the encrypted content section 46 of the file 14. This is performed by a content decryption routine 80 designed to allow for decryption of the encrypted content 46. Where the content is further compressed within the encrypted file 14, a decompression routine 82 optionally serves to decompress the digital file 50, and will typically perform an inverse operation to that performed by compression routine 74 of the sending computer. As a result, the receiving computer 16 will obtain the digital file 50 reconstructed for access by the user. Depending on the type of digital file, a player or display application 84 allows the user of the receiving computer to open, view, modify, listen to or otherwise use and interact with the digital file 50. For example, for text files, the application may include a text editor, while for multi-media files the application will typically include a multi-media player or editor. The user interface 38 will typically include a display 86, with speakers and any other interactive tools that allow the digital file 50 to be used by a user of the receiving computer 16.

All of the routines discussed above will typically be stored within the memory circuitry 32 of the receiving computer and executed by the processor 30. It is important to note that while the discussion above illustrates a linear decryption path where, once the verification criteria 76 is met, the content 46 is decrypted, this is not intended to limit the current invention to such a linear decryption path.

In some embodiments, the decryption routine 80 may decrypt the encrypted content in real-time, thus requiring one or more of the verification criteria 76 to be continuously net at the receiving computer for continued decryption of the encrypted content 46. For example, the decryption routine 80 may decrypt only a portion of encrypted content 46 and/or temporarily decrypt encrypted content 46, such that the verification criteria 76 must continuously be net in order for subsequent portions and/or subsequent time periods of decryption may be maintained. As the user attempts to view subsequent portions of the encrypted contents, the subsequent portions of the encrypted content 46, the criteria 76 may be verified and the subsequent portions may be decrypted. In some embodiments, any previously decrypted portions may be re-encrypted. Thus, in certain embodiments, the client-side watermarking verification routine 78 may continuously determine whether the watermarking criteria are met. Thus, an encrypted file may only be viewable so long as these criteria 78 are met.

In certain embodiments that implement real-time decryption, the decryption routine 80 may cache portions of decrypted content. In certain embodiments, the decryption routine 80 may decrypt a portion of encrypted content that a user is attempting to view plus an additional portion of the encrypted content. For example, when a user attempts to view a portion of an encrypted video or music, the decryption routine 80 may decrypt the portion the user is attempting to view plus sixty additional seconds of the video or music. Thus, when criteria 76 (e.g., the watermarking criteria 78) is no longer met, the user may be allowed to view decrypted content for sixty additional seconds before the video is no longer accessible. In such embodiments, a warning message may be provided to the user stating the amount of cached time left before the decrypted content will no longer be available.

In certain embodiments, the decryption routine 80 may fully cache the decrypted content. In such embodiments, the entire decrypted contents may be available on the receiving computer 16. However, a pop-up window or other blocking mechanism may be used to block viewing access to the file when the criteria 76 (e.g., the watermarking criteria 78) is no longer met. For example, in embodiments where active watermarking is required for access to a file, the blocking mechanism may be triggered. In embodiments, where the decrypted content is fully cached on the receiving computer, a pop-up box may block viewing of the decrypted content. Such blocking mechanism may be provided immediately upon detecting that the criteria 76 no longer being met, or may be provided after a grace period (e.g., sixty seconds) after the criteria. 76 is no longer met.

In the embodiment illustrated in FIG. 3, messages may also be exchanged between the sending computer 12 and receiving computer 16. As described above, one message may include a transmission of the encrypted file 14. Further, as will be discussed in more detail below, the client-side watermarking routine 36 may provide requests and/or responses to the sending computer 12 or a watermarking server. Messages 88 may also be returned by the receiving computer 16 to the sending computer 12 to indicate the success or failure of the receipt and use of the encrypted file 14, status of the client-side watermarking, or other information about the receiving computer 16.

Figure 4:
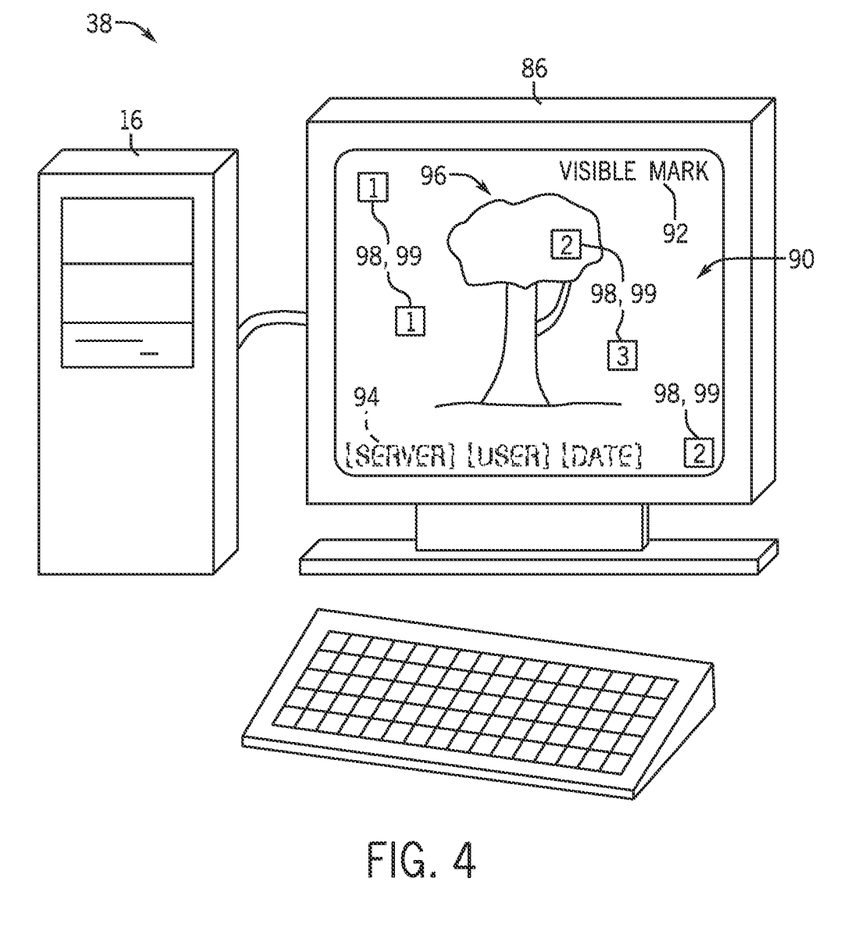
FIG. 4 is a schematic diagram of a receiving computer where watermarks are provided as an overlay for decrypted video output, in accordance with an embodiment.

FIG. 4 illustrates an example of output provided to the display 86 of the receiving computer 16, in accordance with an embodiment. As previously discussed, the watermarking software 36 may provide watermarks as an overlay of the video output 90 presented by the display 86. In some embodiments, visible watermarks 92 may be presented. Further, in certain embodiments invisible watermarks 94 may be presented. As mentioned in the discuss regarding FIG. 3, the watermark verification criteria 78 may include criteria that the watermarking routine 36 be active in order for decryption of the content to take place. Accordingly, because the watermarking is active in the current example (as shown by the existence of watermarks 92 and/or 94), the content (e.g., the tree video 96) is presented on the display 86.

The visible watermarks 92 and invisible watermarks 94 may be configured with different attributes. For example, watermark placement, font style, font size, color, and opacity may be changed. Further, the presented data may be static or dynamically rendered data. For example, the visible mark 92 is static text. Here, the text reads "VISIBLE MARK."

The invisible watermark 94 provides dynamic data in the current example. For example, the provided invisible watermark 94 is formatted to provide a server id, a user id, and a date, as signified by "[SERVER][USER][DATE]." The server id may be a unique identifier that identifies a server (e.g., the sending computer 12) that either provided the encrypted file 11 and/or a server where a user associated with the watermarking software 36 has registered for a unique watermarking identifier. The user id may be the unique watermarking identifier for the receiving computer 16 and/or the user of receiving computer 16. As will be discussed in more detail below, a user and/or receiving computer 16 may register with a watermarking service, which results in a unique identifier that identifies the receiving computer 16 and/or a particular user of the receiving computer 16. The date indicator may indicate a date and/or time the watermark 94 is presented. In certain embodiments, the watermark 94 pattern may be in the form of a 16 bit server uid segment+a 32bi user uid segment t+a 16 bit date/time segment.

In some embodiments, it may be useful to provide randomized watermarks 98 (e.g., a random number of watermarks and/or watermarks in random locations). As illustrated, a random number and location of watermarks 98. This may hinder any attempt to strip, blur, or otherwise hinder presentation of the watermarks 98, because the location and/or number of watermarks 98 may be unpredictable. As illustrated, the watermarks may consist of condensed watermarks 99. Condensed watermarks may provide data while being presented in a small form factor. For example, the watermarks 99 may include QRCode watermarks, Datamatrix watermarks, barcodes, etc. that provide relevant data, while being presented in a condensed manner.

Figure 5:
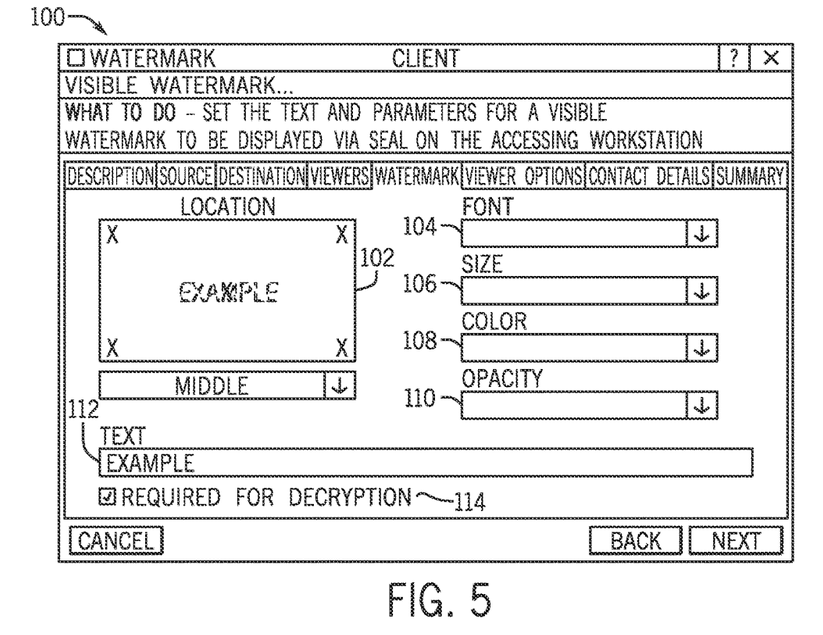
FIG. 5 is an example of a global watermark configuration settings graphical user interface (GUI), in accordance with an embodiment.

FIG. 5 illustrates an example of a graphical user interface (GUI) 100 useful for configuring the watermarking attributes described above at a global level. In some embodiments, the graphical user interface 100 is provided at the user interface 24 of the sending computer 12. By setting the watermarking attributes at the sending computer 12, the attributes may be added to the encrypted file 14, for example as part of the encrypted security attribute section 42 of the encrypted file 14. As illustrated, the GUI 100 may include a location option 102 defining a position of the watermark. Further, a font type 104, font size option 106, font color option 108, and opacity option 110 may be provided, each of which affect the watermark's font. Additionally, a text box 112 may provide an option for defining the text displayed by the watermark. A required for encryption option 114 may set criteria for decryption. For example, when checked, the option 114 will allow the encrypted file 14 to be decrypted at the receiving computer only when the requisite watermarks are active on the display 86.

Figure 6:
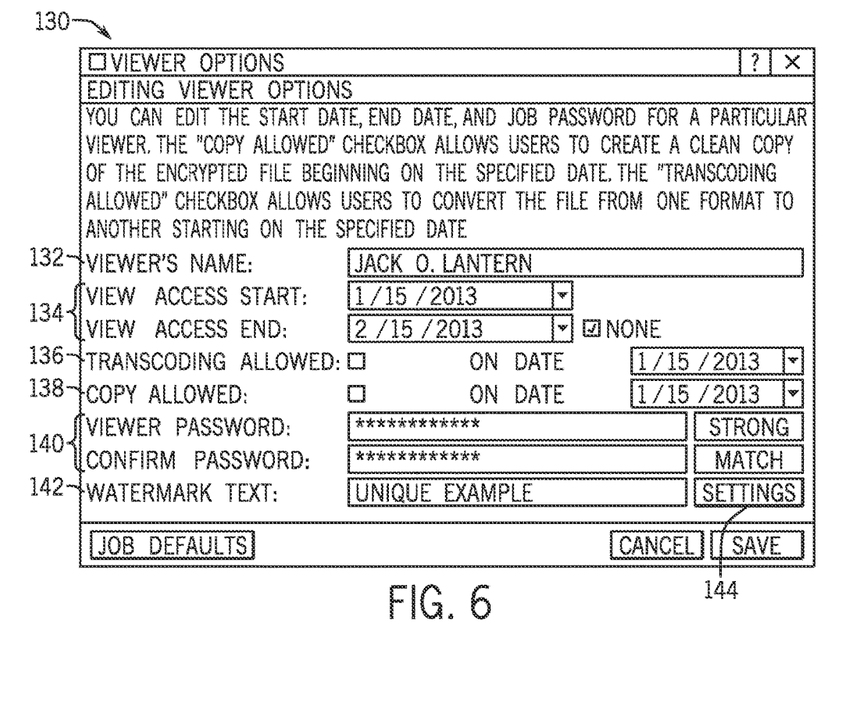
FIG. 6 is an example of a local watermark configuration settings graphical user interface (GUI) useful for configuring watermarks for an individual user or group of users, in accordance with an embodiment.

In some embodiments, the user of the receiving computer 16 may be known. In such embodiments, it may be beneficial to set watermark settings based upon the user. FIG. 6 illustrates an example of a graphical user interface (GUI) 130 useful for configuring a watermark based upon a particular user/receiver accessing the file 14. As illustrated, the GUI 130 provides the user's name 132 (e.g., "Jeff Taylor"). A viewing access period is defined by options 134. The transcoding option 136 enables a user to convert the file from one format to another. The copy allowed option 138 allows a user t create a clean copy of the encrypted file. The password settings 140 create password criteria for the user. The watermark text box 142 enables a particular watermark text to be presented when the file 14 is accessed by the user and the settings option 144 may result in a GUI similar to GUI 100 being presented, which enables watermark attributes to be set for the particular user.

Figure 7:
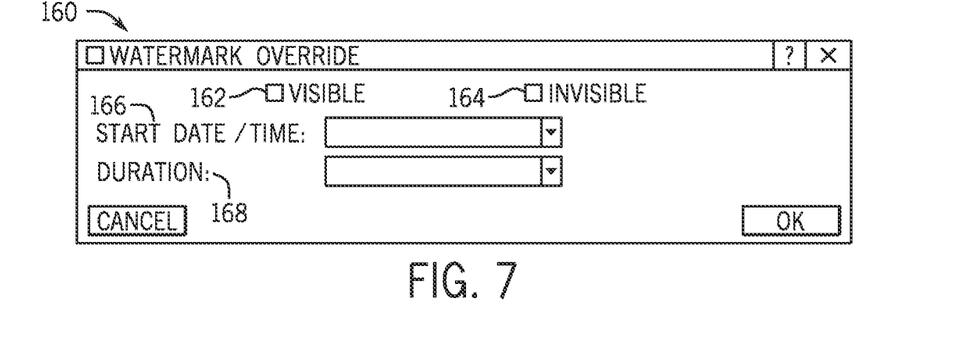
FIG. 7 is an example of a watermark override graphical user interface (GUI), in accordance with an embodiment.

It may be desirable, in certain embodiments, to enable a user to override any watermarking requirements at the receiving computer 16. For example, while the watermarking attributes may be set at the sending computer 12, a manual override functionality may be provided at the receiving computer 16. FIG. 7 illustrates an example of a GUI 160 providing a watermarking override option. Upon the user indicating a desire to override watermarking requirements and providing proper override credentials (e.g., an override password), the GUI 160 may be presented. Options 162 and 164 enable the user to override visible and invisible watermarking requirements, respectively. Option 166 enables a user to override the requirements starting at a particular time and option 168 enables a user to override the requirements for a particular duration. Once the duration is over, the watermarking requirements are reinstated.

In some embodiments, additional rules may be configured regarding overriding watermarks. For example, an advance override may be limited to a maximum time period (e.g., 48 hours) prior to the actual override. Accordingly, and override attempt past the maximum time period would be unsuccessful. Further, the override duration may be limited. In certain embodiments, the override duration may be limited to no more than 24 hours.

Figure 8:
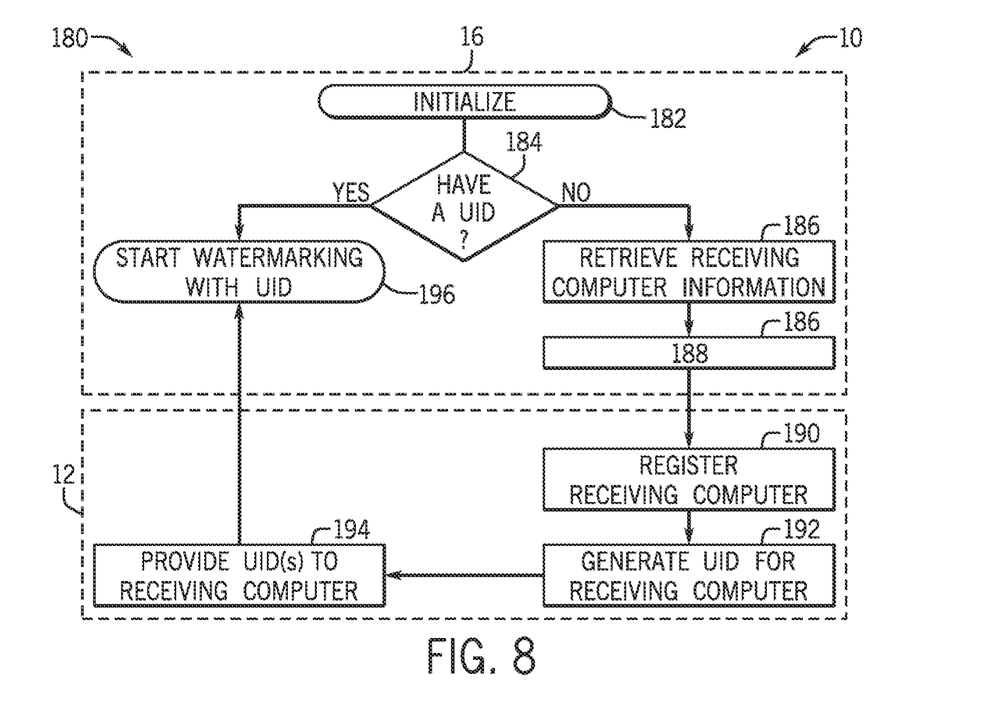
FIG. 8 is a flowchart illustrating a process for registering receiving computers with a watermarking service, in accordance with an embodiment.

As previously mentioned, unique identifiers may be utilized in the watermarks, such that the receiving computer and/or a receiving user may be identified. FIG. 8 illustrates a process 180 for registering a workstation and/or user, such that unique identifiers may be utilized in the presented watermarks. The process 180 begins by initializing the watermarking software 36 (block 182). For example, the software 36 may be initiated when the receiving computer 16 is booted. Next, a determination is made at the receiving computer 16 as to whether the receiving computer has a unique id associated with a watermarking service (e.g., running on the sending computer 12) (block 184). If no unique id relating to the receiving computer 16 is associated with the watermarking service, the receiving computer may compile a list of information needed for registration (block 186). The list of information needed for registration may be provided by the watermarking service. In certain embodiments, the information may include: a name, serial number, local and/or global IP address, MAC address, and/or domain of the receiving computer. Further, the information may include a user login name, installed applications, additional user account names, etc. After compiling the list of information needed, the receiving computer sends a registration request to the watermarking service (block 188). The registration request may include the compiled information. Upon receiving the request, the watermarking service may register the receiving computer 16 (block 190). For example, one or more database entries may store the compiled information, along with other information useful for providing the watermarking services. As part of the registration process, the watermarking service may generate a unique id representative of the receiving computer 16 (block 192). The watermarking service may then provide the unique id representative of the receiving computer 16 and an additional unique id representative of the service that generated the first unique id to the receiving computer 16 (block 194). Upon receiving the unique ids, or if the unique ids already existed at block 184, the watermarking using the unique ids may commence at the receiving computer (block 196).

Figure 9:
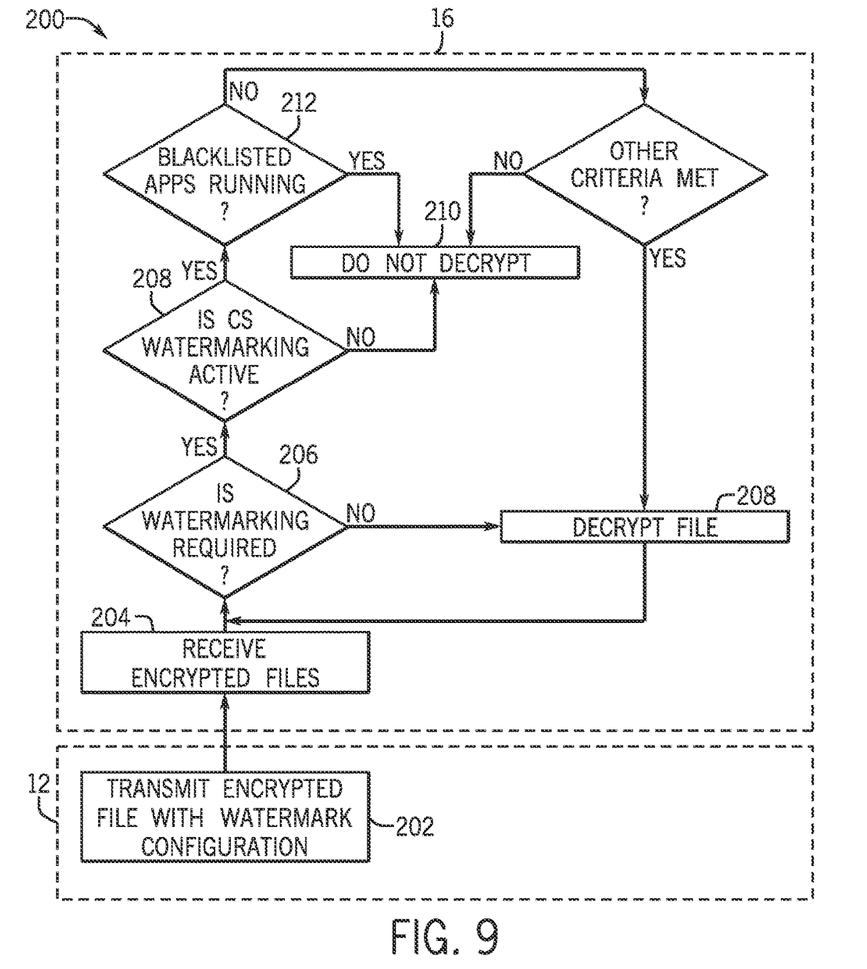
FIG. 9 is a flowchart illustrating a process for decrypting content based upon client-side watermarking criteria, in accordance with an embodiment.

As mentioned above, the encrypted file 14 may decrypted based upon watermarking criteria. FIG. 9 illustrates a process 200 for decrypting content based upon client-side watermarking requirements. First, the encrypted file 14 is transmitted from the sending computer 12 to the receiving computer 16 (block 202). As mentioned above, the encrypted file 14 may include watermark configuration attributes, which define the watermark criteria that must be met before decryption. Upon receiving the encrypted file (block 204), a determination is made as to whether watermarking is required for decryption based upon the criteria found in the encrypted file 14 (block 206). If decryption is not required, the file 14 is decrypted (block 208). If watermarking is required, a determination is made as to whether client-side watermarking software 36 is active and/or the watermarks are being presented (e.g., on the display 86) (block 208). If the client-side watermarking software 36 is not active and/or the watermarks are not being presented, the file 14 is not decrypted (block 210). If, however, the client-side watermarking software 36 is active and/or the watermarks are being presented, a determination is made as to whether blacklisted applications are running (block 212). Blacklisted applications may include applications that have been deemed unsecure to run along side the decrypted content. For example, blacklisted applications may include applications that hinder display of watermarks and/or enable unauthorized actions, such as unauthorized copying of the decrypted content. If blacklisted applications are running, the file 14 is not decrypted (block 210). However, if no blacklisted applications are detected, the system determines whether all other criteria 76 is met. If the criteria 76 are not met, the file 14 is not decrypted (block 210). If all of the criteria 76 are met, the file 14 is decrypted (block 208).

Figure 10:
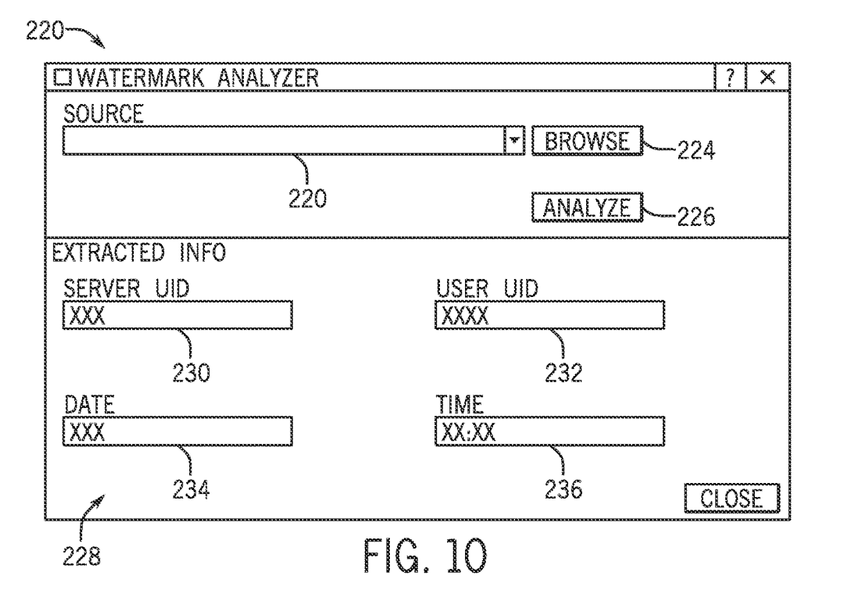
FIG. 10 is an example of a watermark analyzer routine, in accordance with an embodiment.

FIG. 10 illustrates a watermark analyzer routine 220, which may be executed as machine-readable instructions, stored on a non-transitory, tangible, machine-readable medium. The watermark analyzer routine 200 actively searches content for the watermarks presented by, for example, the watermarking routine 36. The watermark analyzer routine 200 may take as an input, content indicated in the source field 222 or via "browse" functionality 224. Upon triggering an analysis of the content (e.g., via an analyze option 226), the routine 200 may scour the content for one or more watermarks. Upon detecting one or more watermarks, the extracted information section 228 is populated. In this section, information contained within the one or more watermarks may be extracted and provided. For example, in the current example, a server uid 230, user uid 232, date of watermarking 234, and time of watermarking 236 have all been extracted from the watermark. In embodiments where more than one watermark is present, the extracted information section 228 may include data extracted from each of the found watermarks.

It should be noted that in the foregoing discussion, reference is made to the sending and receiving computers. In practice, where desired these roles may reverse. That is, the receiving computer may be configured with software and functionality similar to the sending computer. In such cases, the receiving computer may alter the digital file, or create other files that may be sent back to the sending computer, or to other computers that are configured as receiving computers. Although, as noted above, in a presently contemplated embodiment, the file is sent to the receiving computer in a "read only" or "play only" format, as also noted above, in other contexts the file may be alterable, such that the receiving computer may then store and retransmit the digital content, in a manner similar to that used by the sending computer. In such cases, the original sending computer may require active watermarking in the same manner as the original receiving computer did.

Technical effects of the invention include the ability to more securely transfer and access digital files between a sending computer and a receiving computer. In particular, the technical effects extend to a wide range of digital files, including text files, audio files, video files, multi-media files, and so forth. By virtue of the techniques described above, user access to such files is limited by virtue of particular client-side watermarking criteria being met. For example, access to the digital file contents may be permitted only when client-side watermarking is active and/or blacklisted applications counteracting the client-side watermarking are not running. Substantial improvement in the secure transmission and access to digital files is therefore contemplated, along with reduction in the risk of pirating and other types of pilfering of digital files and their content.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for controlling access to a digital file, comprising:
    on a receiving computer, accessing an encrypted file, the file including a security attribute and encrypted digital content provided by a sending computer, the security attribute comprising data identifying one or more watermarking criteria for watermark implementation on the receiving computer to be met for decryption of the encrypted digital content;
    accessing, on the receiving computer, the security attribute to determine the one or more watermarking criteria;
    determining whether the watermarking criteria is met on the receiving computer;
    decrypting, at the receiving computer, the encrypted digital content only when the watermarking criteria is met;
    periodically re-determining whether the watermarking criteria is met; and
    re-encrypting any decrypted content when the watermarking criteria is not met.

2. The method of claim 1, wherein the watermarking criteria relates to watermarking features that must be presented at the receiving computer prior to decrypting the encrypted digital content; and
    wherein the method comprises:
        determining whether the watermarking features are presented at the receiving computer; and
        decrypting the encrypted digital content only when the watermarking features are presented at the receiving computer.

3. The method of claim 1, comprising obtaining referenced watermarking criteria from a database, wherein the one or more watermarking criteria of the security attribute comprises a pointer to the referenced watermarking criteria from the database.

4. The method of claim 1, wherein a portion of the security attribute is encrypted and wherein the method includes decrypting the portion of the security attribute prior to accessing the security attribute.

5. The method of claim 1, wherein the digital content is compressed and wherein the method includes decompressing the digital content after decryption.

6. The method of claim 1, wherein the one or more watermarking criteria represent that watermarking must be presented at the receiving computer while the encrypted digital content is decrypted, and
    wherein the method comprises playing, displaying or modifying the digital content on the reading computer only upon determining that the watermarking is presented at the receiving computer.

7. The method of claim 6, comprising:
    determining that the watermarking is presented at the receiving computer by:
        determining that a watermarking driver is installed at the receiving computer; and
        determining that watermarking software configured to present watermarks via the watermarking driver is running at the receiving computer.

8. The method of claim 1, wherein the encrypted digital content is decrypted and played, displayed or modified by an application that performs the steps of claim 1 when a user attempts to access the encrypted digital content via the application.

9. The method of claim 1, wherein the recited steps of claim 1 are performed by a routine stored on the receiving computer.

10. The method of claim 1, comprising continuously decrypting only a portion of the encrypted digital content that a user is attempting to view so long as the watermarking criteria is met.

11. A computer-implemented method for controlling access to a digital file, comprising:
    on a receiving computer, accessing an encrypted file, the file including a security attribute and encrypted digital content provided by a sending computer, the security attribute comprising data identifying one or more watermarking criteria for watermark implementation on the receiving computer to be met for decryption of the encrypted digital content;
    accessing, on the receiving computer, the security attribute to determine the one or more watermarking criteria;
    determining whether the watermarking criteria is met on the receiving computer;
    determining whether each video card associated with the receiving computer has an associated watermarking driver; and
    decrypting, at the receiving computer, the encrypted digital content only when the watermarking criteria is met and only if each video card has an associated watermarking driver, when the watermarking criteria requires watermarking features to be presented prior to decrypting the encrypted digital content.

12. A computer-implemented method for controlling access to a digital file, comprising:
    on a receiving computer, accessing an encrypted file, the file including a security attribute and encrypted digital content provided by a sending computer, the security attribute comprising data identifying one or more watermarking criteria for watermark implementation on the receiving computer to be met for decryption of the encrypted digital content;

accessing, on the receiving computer, the security attribute to determine the one or more watermarking criteria;

determining whether the watermarking criteria is met on the receiving computer; and decrypting, at the receiving computer, the encrypted digital content only when the watermarking criteria is met;

wherein the watermarking criteria comprises blacklisted applications, and wherein the method comprises:

determining whether any of the blacklisted applications are running on the receiving computer; and decrypting the encrypted digital content only when none of the blacklisted applications are running on the receiving computer.

13. A computer-implemented method for controlling access to a digital file, comprising:

on a receiving computer, accessing an encrypted file, the file including a security attribute and encrypted digital content provided by a sending computer, the security attribute comprising data identifying one or more watermarking criteria for watermark implementation on the receiving computer to be met for decryption of the encrypted digital content;

accessing, on the receiving computer, the security attribute to determine the one or more watermarking criteria;

determining whether the watermarking criteria is met on the receiving computer; and decrypting, at the receiving computer, the encrypted digital content only when the watermarking criteria is met;

wherein decrypting the encrypted content comprises decrypting the entire encrypted digital content and providing a pop-up window configured to block viewing of the decrypted content when the watermarking criteria is no longer met.

14. A method for controlling access to a digital file, comprising:

associating digital content with a security attribute, the security attribute including watermarking criteria for watermark implementation on a receiving computer to be met for decryption of the encrypted digital content, a pointer to the watermarking criteria, or both;

encrypting the security attribute and the digital content to create an encrypted digital file;

transmitting the encrypted digital file to the receiving computer;

wherein the security attribute is susceptible to decryption, via the receiving computer, separate from the digital content; and wherein the digital content is susceptible to valid decryption, at the receiving computer, only upon the watermarking criteria being met at the receiving computer.

15. The method of claim 14, wherein the security attribute includes the pointer, and wherein the method comprises:

obtaining the watermarking criteria based upon the pointer, determining whether the watermarking criteria is met, and decrypting the encrypted digital content only when the watermarking criteria is met.

16. The method of claim 14, wherein the security attribute comprises a user-specific security attribute, a group-specific security attribute, or both.

17. A method for controlling access to a digital file, comprises:

receiving an indication of one or more attributes for a watermark to be presented with digital content;

associating the digital content with a security attribute, the security attribute including watermarking criteria for watermark implementation on a receiving computer to be met for decryption of the encrypted digital content, a pointer to the watermarking criteria, or both, wherein the watermarking criteria comprises the one or more attributes for the watermark, such that the one or more attributes for the watermark may be used by the receiving computer to provide the watermark with one or more attributes;

encrypting the security attribute and the digital content to create an encrypted digital file, such that the digital content may only be decrypted when the receiving computer implements a watermark according to the watermarking criteria;

periodically re-determining whether the watermarking criteria is met; and re-encrypting any decrypted content when the watermarking criteria is not met.

18. The method of claim 17, wherein the one or more attributes comprise: a location for the watermark, a font style for the watermark, a size of font for the watermark, a color of font for the watermark, an opacity of the watermark, data to be displayed by the watermark, or any combination thereof.

19. The method of claim 18, wherein the one or more attributes comprise:

a user-specific attribute configured to be used only when a particular user accesses the encrypted digital file, a group-specific attribute configured to be used only when a member of a particular group of users accesses the encrypted digital file, or both.

20. A system for controlling access to a digital file, comprising:

an encrypted file including a security attribute and encrypted digital content, the security attribute including watermarking criteria for watermark implementation on a receiving computer to be met for decrypting the encrypted digital content at a receiving computer;

the receiving computer, configured to receive the encrypted file, comprising a watermark verification routine configured to:

determine whether the watermarking criteria is met at the receiving computer, decrypt the encrypted content only if the watermarking criteria is met;

periodically re-determining whether the watermarking criteria is met; and re-encrypting any decrypted content when the watermarking criteria is not met.

21. The system of claim 20, wherein the watermark verification routine is configured to periodically determine whether the watermarking criteria is met, and re-encrypt any decrypted content when the watermarking criteria is no longer met.

22. The system of claim 20, wherein the watermarking criteria comprises criteria that an invisible watermark, a visible watermark, or both be presented with any decrypted content.

23. The system of claim 20, wherein the watermark verification routine comprises override functionality configured to disable the watermarking criteria.

24. The system of claim 23, wherein the override functionality is available only upon providing proper override credentials.

25. The system of claim 23, wherein the over functionality comprises a graphical user interface configured to provide selections of one or more particular watermarking criteria to override.

26. The system of claim 25, wherein the selections comprise: visible watermarks, invisible watermarks, a start date for overriding, a start time for overriding, a duration of overriding, or any combination thereof.

27. The system of claim 20, wherein the watermarking criteria comprises formatting criteria for a watermark that is to be presented with any decrypted content.

28. The system of claim 27, wherein the formatting criteria comprises a location for the watermark, a font style for the watermark, a size of font for the watermark, a color of font for the watermark, an opacity of the watermark, data to be displayed by the watermark, or any combination thereof.

29. The system of claim 28, wherein the formatting criteria comprises a data pattern for dynamic data that is to be presented by the watermark.

30. The system of claim 29, wherein the dynamic data comprises a first unique identifier representative of a computer where the digital content is decrypted, a second unique identifier representative of a watermarking service that provided the first unique identifier, a date of decryption, a time of decryption, or any combination thereof.

31. The system of claim 30, wherein the data pattern comprises a text string comprising the first unique identifier, the second unique identifier, and the date of decryption, time of decryption, or both.

32. A system for controlling access to a digital file, comprising:
an encrypted file including a security attribute and encrypted digital content, the security attribute including watermarking criteria for watermark implementation on a receiving computer to be met for decrypting the encrypted digital content at a receiving computer;
the receiving computer, configured to receive the encrypted file, comprising a watermark verification routine configured to:
determine whether the watermarking criteria is met at the receiving computer, and
decrypt the encrypted content only if the watermarking criteria is met;
wherein the watermarking criteria comprises criteria that a condensed watermark be presented with any decrypted content.

33. A system for controlling access to a digital file, comprising:
an encrypted file including a security attribute and encrypted digital content, the security attribute including watermarking criteria for watermark implementation on a receiving computer to be met for decrypting the encrypted digital content at a receiving computer;
the receiving computer, configured to receive the encrypted file, comprising a watermark verification routine configured to:
determine whether the watermarking criteria is met at the receiving computer, and
decrypt the encrypted content only if the watermarking criteria is met;
wherein the override functionality is available only upon providing proper override credentials; and
wherein the override credentials are defined in the security attribute of the encrypted file.

34. A tangible, non-transitory, machine-readable medium, comprising machine-readable instructions to:
receive an encrypted file including a security attribute and encrypted digital content, the security attribute including watermarking criteria for watermark implementation on a receiving computer to be met for decrypting the encrypted digital content at a receiving computer;
detect presentation of one or more watermarks at the receiving computer, the one or more watermarks comprises an overlay prior to decrypting the piece of content;
extract one or more pieces of information from the watermark;
continually determine if the one or more pieces of information satisfy the watermarking criteria;
decrypt the piece of content only when the one or more pieces of information satisfy the watermarking criteria;
periodically re-determine whether the watermarking criteria is met; and
re-encrypt any decrypted content when the watermarking criteria is not met.

* * * * *